(12) United States Patent
Clifton (10) Patent No.: US 8,379,020 B2
(45) Date of Patent: Feb. 19, 2013

(54) IMAGE PROCESSING DEVICE USING SELECTIVE NEIGHBORING VOXEL REMOVAL AND RELATED METHODS

(75) Inventor: William Earle Clifton, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 905 days.

(21) Appl. No.: 12/197,744

(22) Filed: Aug. 25, 2008

(65) Prior Publication Data

US 2010/0045674 A1 Feb. 25, 2010

(51) Int. Cl.
*G06T 17/00* (2006.01)

(52) U.S. Cl. ...................................................... 345/424

(58) Field of Classification Search ................... 345/424
See application file for complete search history.

(56) References Cited

U.S. PATENT DOCUMENTS

| | | | | |
|---|---|---|---|---|
| 5,354,981 | A | 10/1994 | Dyck | 250/214 R |
| 6,246,468 | B1 | 6/2001 | Dimsdale | 356/4.02 |
| 6,330,523 | B1 | 12/2001 | Kacyra et al. | 702/159 |
| 6,420,698 | B1 | 7/2002 | Dimsdale | 250/234 |
| 6,473,079 | B1 | 10/2002 | Kacyra et al. | 345/419 |
| 6,512,518 | B2 | 1/2003 | Dimsdale | 345/427 |
| 6,512,993 | B2 | 1/2003 | Kacyra et al. | 702/159 |
| 7,242,460 | B2 | 7/2007 | Hsu et al. | 356/4.01 |
| 7,304,645 | B2 | 12/2007 | Blask et al. | 345/424 |
| 7,990,378 | B2 * | 8/2011 | Rabben et al. | 345/424 |
| 2002/0059042 | A1 | 5/2002 | Kacyra et al. | 702/152 |
| 2002/0145607 | A1 | 10/2002 | Dimsdale | 345/423 |
| 2002/0149585 | A1 | 10/2002 | Kacyra et al. | 345/428 |
| 2002/0158870 | A1 | 10/2002 | Brunkhart et al. | 345/424 |
| 2003/0001835 | A1 | 1/2003 | Dimsdale et al. | 345/419 |
| 2005/0243323 | A1 * | 11/2005 | Hsu et al. | 356/450 |
| 2008/0117518 | A1 | 5/2008 | Wang et al. | 359/618 |
| 2008/0154524 | A1 | 6/2008 | Shirley | 702/66 |
| 2008/0238919 | A1 * | 10/2008 | Pack | 345/420 |

OTHER PUBLICATIONS

Tan el al.; "Introduction to Data Mining," Addision-Wesley, May 2005, pp. 526-532.*
Murino et al., "Three-Dimensional Image Generation and Processing in Underwater Acoustic Vision" Proceedings of the IEEE, NY, vol. 88, No. 12, Dec. 1, 2000.
Kiss et al., "Computer Aided Detection for Low-Dose CT Colonography" Medical Image Computing and Computer-Assisted Intervention—MIC CAI 2005 Lecture Notes in Computer Science, LNCS, Springer, Berlin, DE vol. 3749, Jan. 1, 2005, pp. 859-867.
Jonathan B. Ashcom, S. Kaushik, and R. M. Heinrichs, Coherent Detection with Arrays of Phonton-Counting Detectors, Jul. 12, 2007, $14^{th}$ CLRC.
T. Rohlfing and J. Beier, Improving Reliability and Performance of Voxel-Based Registration by Coincidence Thresholding and Volume Clipping, Published Dec. 2003.

* cited by examiner

*Primary Examiner* — Edward Martello
(74) *Attorney, Agent, or Firm* — Allen, Dyer, Doppelt, Milbrath & Gilchrist, P.A.

(57) ABSTRACT

An image processing device may include a memory, and a controller. The controller may cooperate with the memory for determining N nearest neighbors for each voxel among a plurality thereof, and determining a respective distance between each voxel and its N nearest neighboring voxels. The controller may also cooperate with the memory for selectively removing each given voxel if a respective distance to an $M^{th}$ nearest neighboring voxel is greater than a first threshold, and with M being less than or equal to N. Optionally, the controller may also cooperate with the memory for selectively removing each other given voxel if a respective distance to an $L^{th}$ nearest neighboring voxel is less than a second threshold, with the second threshold being less than the first threshold and with L being less than M.

17 Claims, 6 Drawing Sheets

IMAGE PROCESSING DEVICE USING SELECTIVE NEIGHBORING VOXEL REMOVAL AND RELATED METHODS

FIELD OF THE INVENTION

The present invention relates to the field of image processing, and, more particularly, to voxel image processing and related methods.

BACKGROUND OF THE INVENTION

For nearly sixty years, radio detection and ranging (radar) has provided a method for determining the direction and speed of distant objects, for example, airplanes. The method includes transmitting electromagnetic waves toward the distant object, the electromagnetic waves reflecting therefrom, receiving the reflected electromagnetic waves, and processing the reflected electromagnetic waves to determine information about the object. Over the years, the applications for radar have expanded greatly and include, for example, meteorological detection of precipitation, measuring ocean surface waves, air traffic control, and highway speed control devices.

Another approach to remote detection and ranging is light detection and ranging (LIDAR). LIDAR operates in a similar manner to radar but uses light to gather information about the distant object. As will be appreciated by those skilled in the art, LIDAR uses much smaller wavelengths than radar, providing for better resolution.

As demands on LIDAR/radar have grown over the years, applications are using greater resolution and sensitivity. To achieve these goals, the receiver of the typical LIDAR/radar device has become more sensitive to signals. Indeed, for example, in some LIDAR applications, the receiver may comprise a Geiger mode avalanche photodiode, which is capable of detecting individual photons. The LIDAR/radar devices also allow imaging through visual obscurations, such as, clouds and foliage, for example.

A potential drawback to this increased sensitivity is that the receiver may be more susceptible to noise interference, for example, internal system based noise and ambient noise. More particularly, in applications where the desired received signal is low strength, the noise may appear indecipherable from the signal. A typical approach to this drawback is noise filtering, i.e. the process or removing the noise elements from the received signal. For example, the received signal may be filtered to remove all signal elements below a threshold in signal strength. Although this approach may be helpful for applications where the received signal has a high signal-to-noise ratio (SNR), this approach may not be desirable in applications with low SNR since such filtering may remove the desired signal along with any noise.

Another approach to noise filtering is voxel coincidence processing (VCP). The VCP method may include creating a three dimensional histogram, maintaining a threshold count value for each bin, and removing low level signals in highly obscured environments. Another approach to noise filtering is multi-peak range coincidence processing (MPRCP). The MPRCP method may comprise providing a histogram in angle-angle-range space, performing low-pass filtering of range profiles, and converting peaks to (x,y,z) observations. A potential drawback to MPRCP methods may include, for example, the undesired removal of low level signals in highly obscured environments.

An approach to noise filtering in LIDAR applications is disclosed in U.S. Pat. No. 7,304,645 to Blask et al., assigned to the Harris Corporation of Melbourne, Fla., the assignee of the present application. This method may include loading LIDAR point data into a three-dimensional voxel array as a plurality of components, determining connected components in the array, determining a size for each component and a hit count of occupied voxels, and determining whether each occupied voxel is to be written to an output file. The occupied voxels are written to the output file according to a set of criteria based on statistics for determining when a voxel represents a light pulse reflected by a physical object.

SUMMARY OF THE INVENTION

In view of the foregoing background, it is therefore an object of the present invention to provide an image processing device that reduces noise.

This and other objects, features, and advantages in accordance with the present invention are provided by an image processing device that may include a memory, and a controller. The controller may cooperate with the memory for determining N nearest neighbors for each voxel among a plurality thereof, determining a respective distance between each voxel and its N nearest neighboring voxels, and selectively removing each given voxel if a respective distance to an $M^{th}$ nearest neighboring voxel is greater than a first threshold, and with M being less than or equal to N. Advantageously, the image processing device may reduce undesirable noise.

In certain embodiments, the image processing device may be used for processing the voxels to reduce noise from target information in a scene. Furthermore, the controller may also cooperate with the memory for selectively removing each other given voxel if a respective distance to an $L^{th}$ nearest neighboring voxel is less than a second threshold, with the second threshold being less than the first threshold and with L being less than M. In some embodiments, the controller may selectively set the first and second thresholds based upon the plurality of voxels.

Additionally, the plurality of voxels may be based upon target information and noise, Geiger mode avalanche photodiode data, light detection and ranging (LIDAR) data, or radio detection and ranging (radar) data, for example.

Another aspect is directed to a computer implemented method for processing image data comprising determining N nearest neighbors for each voxel among a plurality thereof, determining a respective distance between each voxel and its N nearest neighboring voxels, and selectively removing each given voxel if a respective distance to an $M^{th}$ nearest neighboring voxel is greater than a first threshold, and with M being less than or equal to N.

Another aspect is directed to a computer-readable medium having computer executable modules comprising a memory module, and a controller module. The controller module cooperates with the memory module for determining N nearest neighbors for each voxel among a plurality thereof, determining a respective distance between each voxel and its N nearest neighboring voxels, and selectively removing each given voxel if a respective distance to an Mth nearest neighboring voxel is greater than a first threshold, and with M being less than or equal to N.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
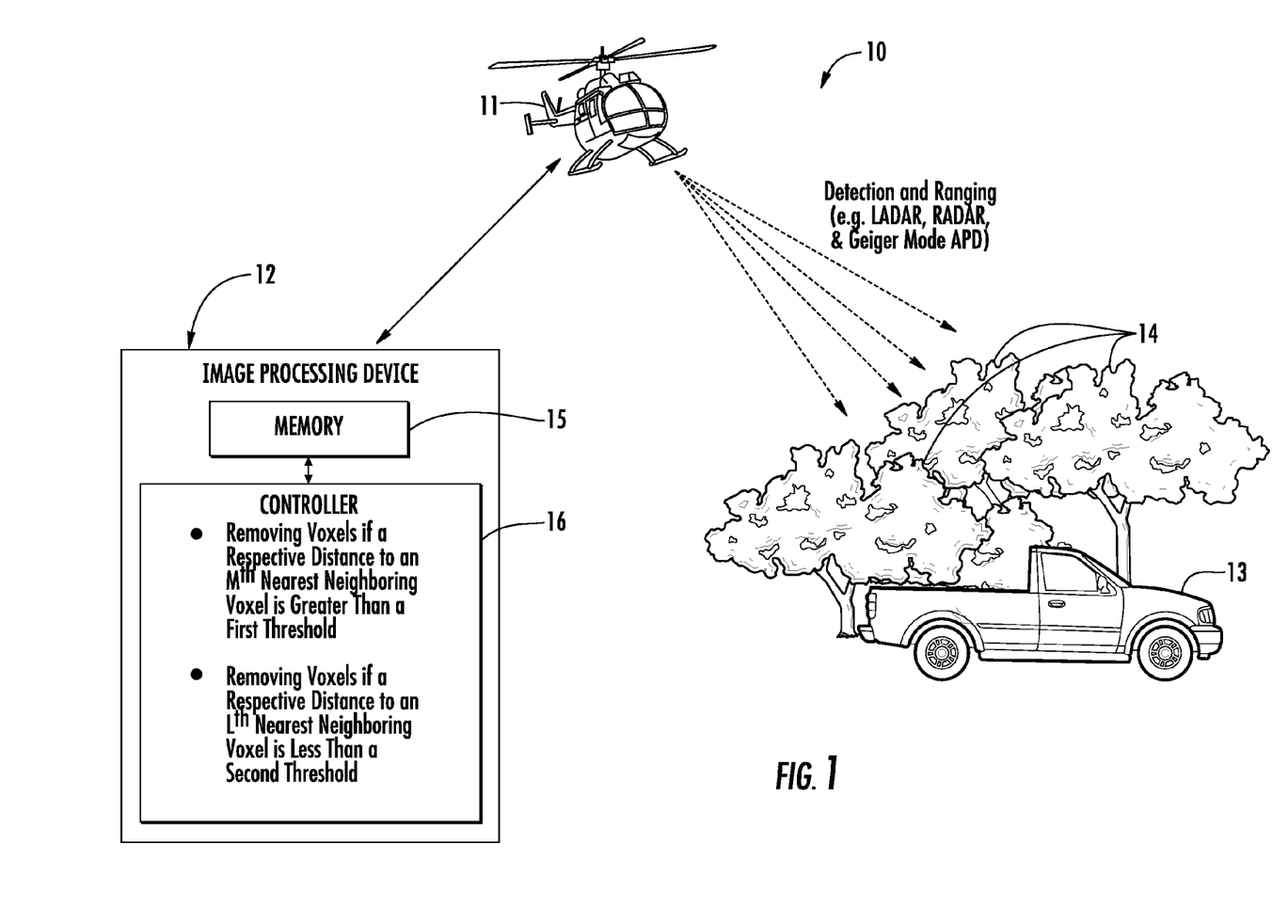
FIG. 1 is schematic block diagram of the imaging system according to the present invention.

Referring initially to FIG. 1, an image processing system 10 is now described. The image processing system 10 illustratively includes an image processing device 12, and a mobile platform, for example, the illustrated helicopter 11. As will be appreciated by those skilled in the art, the mobile platform 11 may include a detection and ranging system, for example, radar, LIDAR, for detecting an obscured target, for example, the illustrated truck 13 covered by foliage 14.

The helicopter 11 is illustratively coupled to the image processing device 12 using, for example, a wireless data communications link for transmission of data collected by the detection and ranging system of the helicopter. In other embodiments, not shown, the image processing device 12 may be installed directly in the helicopter 11, i.e. there would be no wireless data communications link. In yet other embodiments, also not shown, the image processing device 12 may be remote from the helicopter 11, and the collected data may be passed to the image processing device via a digital storage device.

As will be appreciated by those skilled in the art, the collected data is a representation of the truck 13 and may comprise, for example, a voxelized 3-dimensional space. In other embodiments, the collected data may include k-dimensions, for example, where k=4 for x, y, z, and time. In other words, the collected data may include a voxelized 3-dimensional space and corresponding time data. As will be appreciated by those skilled in the art, other embodiments may include more than four dimensions of collected data, i.e. k>4. The collected data may include both target data, relating to the illustrated truck 13, and noise. Moreover, the image processing device 12 may process the voxel data to reduce noise from target information in the illustrated scene.

Figure 2:
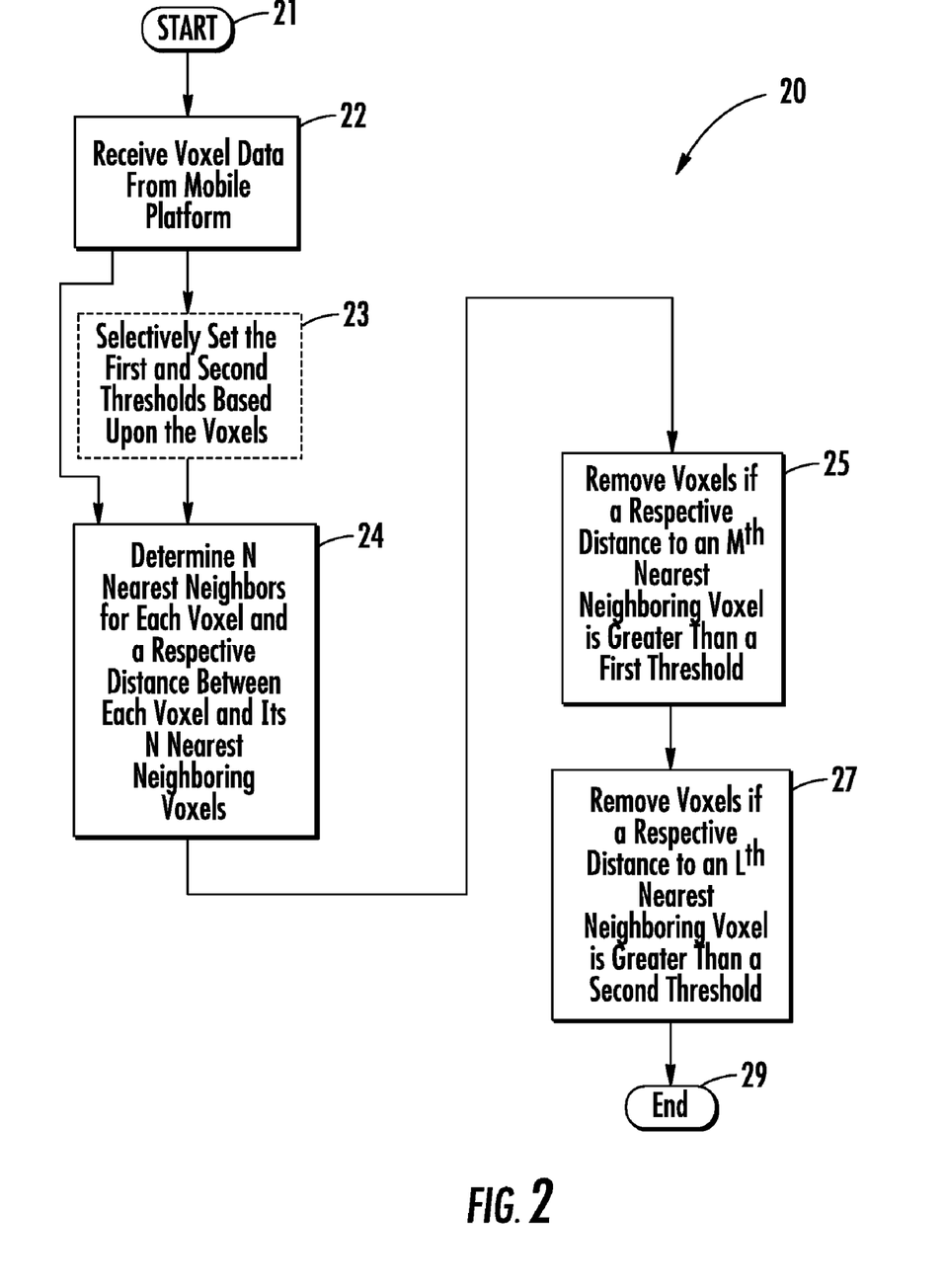
FIG. 2 is a flowchart illustrating the method of processing image data according to the present invention.
Figure 3A:
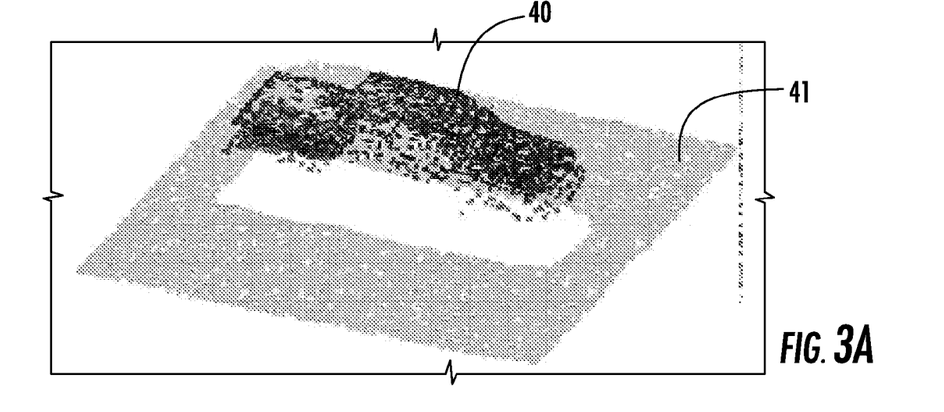
FIGS. 3a-3c are a perspective view, a side view, and a top plan view of a point cloud simulation of a target without noise.
Figure 3B:
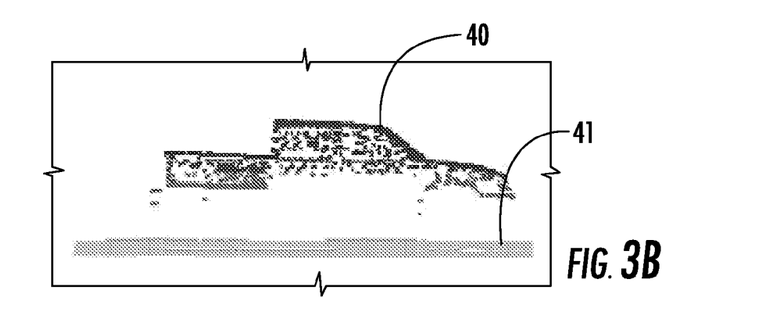
Figure 3C:
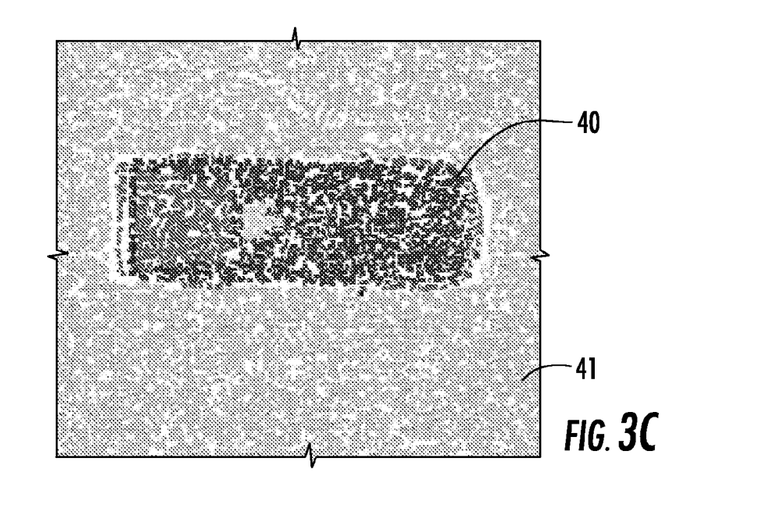
Figure 4A:
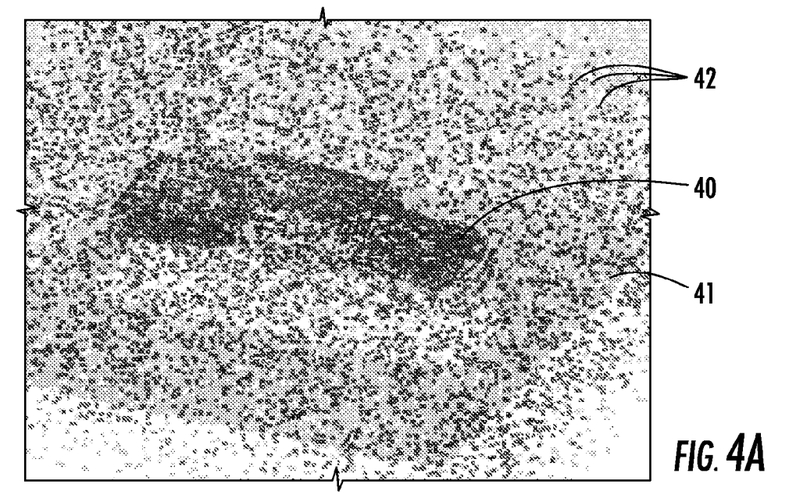
FIGS. 4a-4c are a perspective view, a side view, and a top plan view of a point cloud simulation of the target with noise.
Figure 4B:
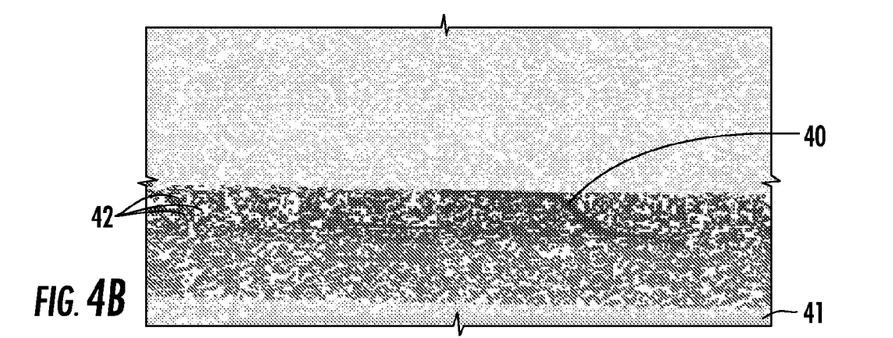
Figure 4C:
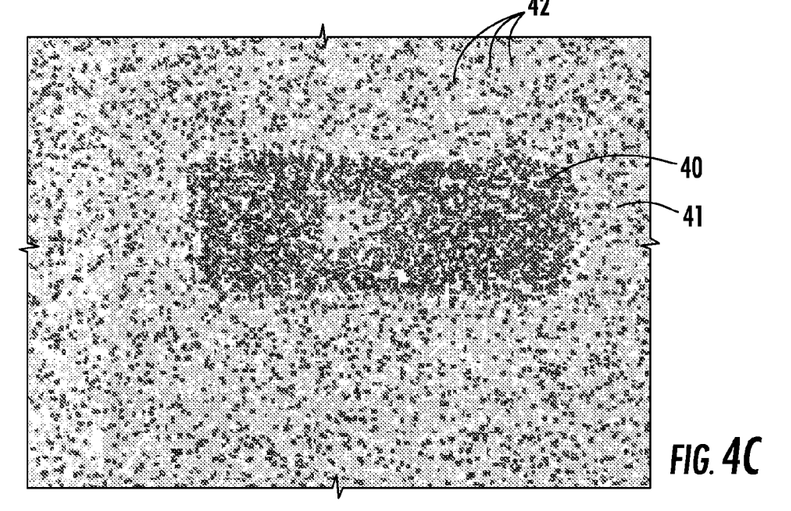

Referring now additionally to FIG. 2, a method for processing image data using the imaging processing device 12 is now described with reference to a flowchart 20. For example, as will be appreciated by those skilled in the art, this method may be computer implemented. The method begins at Block 21 and includes receiving the collected voxel data from the helicopter 11 at Block 22. As will be appreciated by those skilled in the art, the helicopter 11 includes a range and detection system having a transmitter and receiver. For example, in embodiments that use LIDAR, the LIDAR transmitter may include, for example, a green laser operating in flood mode using a 32×32 pixel array, and the LIDAR receiver may include, for example, a Geiger mode avalanche photodiode.

The image processing device illustratively includes a memory 15, and a controller 16 coupled thereto. The controller 16 and memory 15 may be implemented using a combination of hardware and software components/modules to perform the various operations that will be discussed further below, as will be appreciated by those skilled in the art. At Block 24, the controller 16 cooperates with the memory 15 for determining N nearest neighbors for each voxel among a plurality thereof in the collected data from the detection and ranging system of the helicopter 11 and for determining a respective distance between each voxel and its N nearest neighboring voxels. In some embodiments, every voxel in the collected data is processed to determine N nearest neighboring voxels and their respective distances. As will be appreciated by those skilled in the art, these embodiments may be more computationally intensive.

At Block 25, the controller 16 cooperates with the memory 15 for selectively removing each given voxel if a respective distance to an $M^{th}$ nearest neighboring voxel is greater than a first threshold, and with M being less than or equal to N. For example, the controller 16 may remove voxels that have a $5^{th}$ nearest neighboring voxel being greater than 5 meters away in distance. In certain embodiments, M may equal N. Advantageously, voxels that are removed in this step comprise random noise.

Additionally, at Block 27, the controller 16 illustratively cooperates with the memory 15 for selectively removing each other given voxel if a respective distance to an $L^{th}$ nearest neighboring voxel is less than a second threshold, with the second threshold being less than the first threshold and with L being less than M. For example, the controller 16 may remove voxels that have a $2^{th}$ nearest neighboring voxel being less than 2 centimeters away in distance. As will be appreciated by those skilled in the art, the controller 16 may remove the voxels by applying a combination of Boolean logic tests. Advantageously, voxels that are removed in this step comprise internal system noise, i.e. ghosts and jitter, for example.

Moreover, these steps at Blocks 25 and 27 may not be computationally intensive. The computations represent an elegant and efficient algorithm for removing noise from the collected data, thereby readily providing the user with results in a shorter period of time. In some embodiments, shown with dashed lines at Block 23, the controller 16 may selectively set one or more of the first and second thresholds, N, M, and L based upon the plurality of voxels, i.e. the collected data. In other words, the image processing system 10 may automatically adjust filter parameters based upon the collected data. Although the filter parameter adjustment process by the controller 16 may be iterative or histogram analysis based, in other embodiments, a user may operate the image processing system 10 and adjust the filter parameters to provide the most desirable filtered image. The method ends at Block 29.

Figure 6:
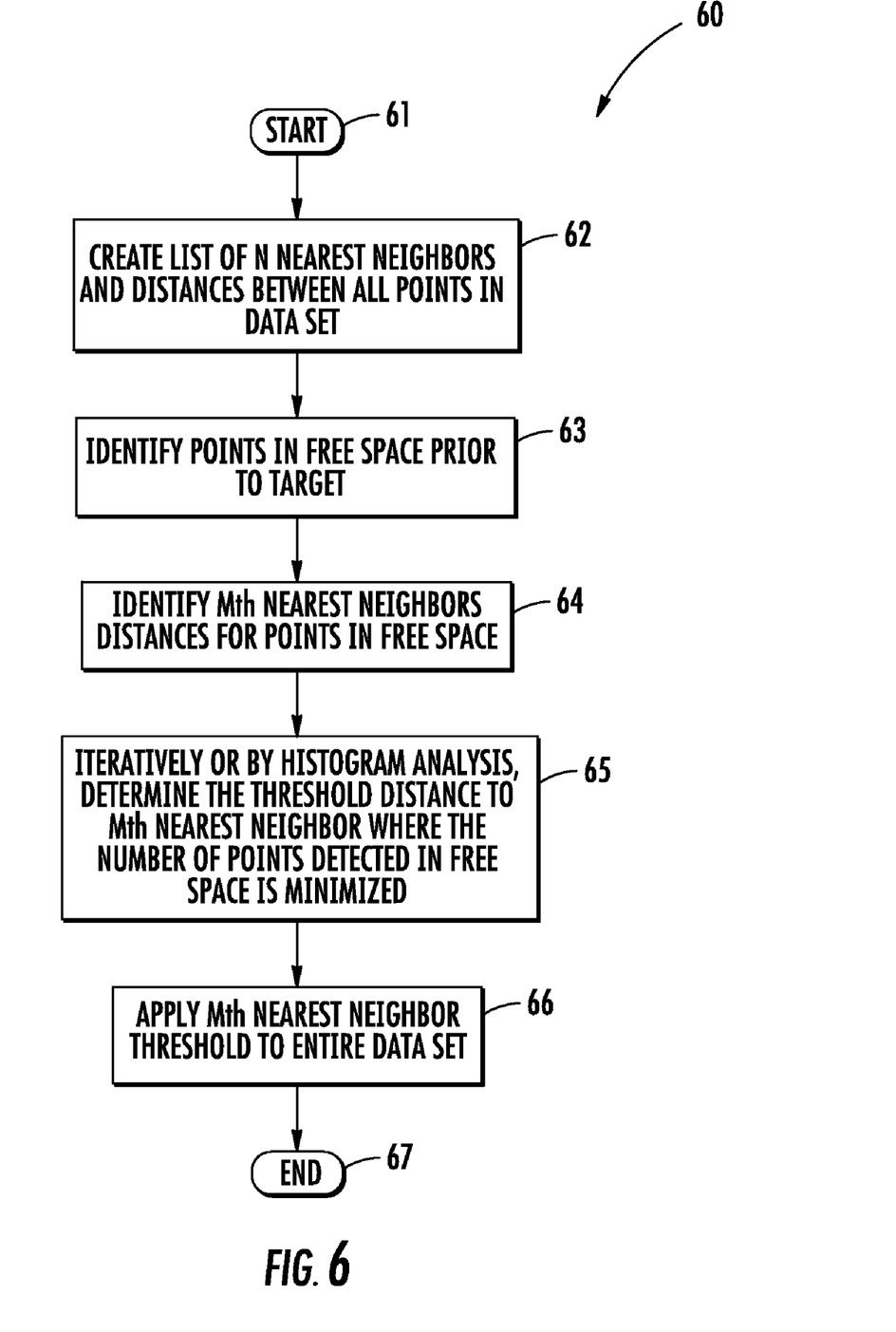
FIG. 6 is a flowchart illustrating selectively setting the first and second thresholds based upon the plurality of voxels according to the present invention.

Referring now additionally to FIG. 6, a flowchart 60 illustrates the process of the controller 16 selectively setting the first and second thresholds, beginning with Block 61. The method includes at Block 62 creating a list of N nearest neighboring voxels and the distances between all the voxels in the collected data. The method also includes at Block 63 identifying the voxels in free space prior to the target, and at Block 64 identifying $M^{th}$ nearest neighboring voxel distances for the voxels in the free space. At Block 65, the method includes determining, either iteratively or by histogram analysis, the first and second threshold distances to the $M^{th}$ nearest neighboring voxel where the voxels detected in free space are minimized. The method further includes at Block 66 applying the nearest neighboring voxel threshold to the entire collected data set. The method ends at Block 67.

Figure 5A:
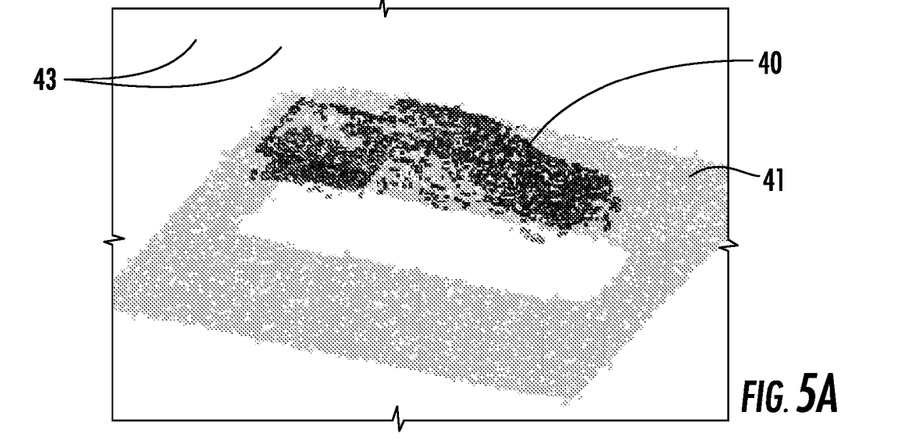
FIGS. 5a-5c are a perspective view, a side view, and a top plan view of a point cloud simulation of the target with the noise removed using the method according to the present invention.
Figure 5B:
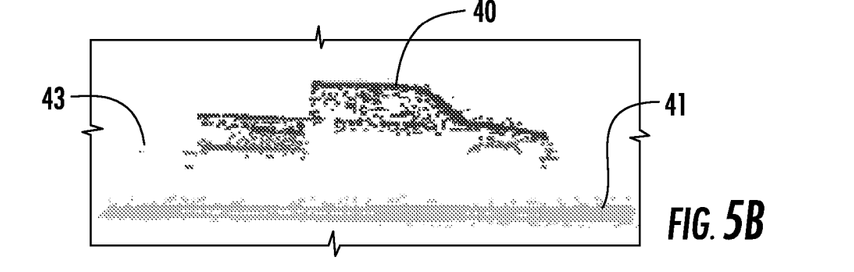
Figure 5C:
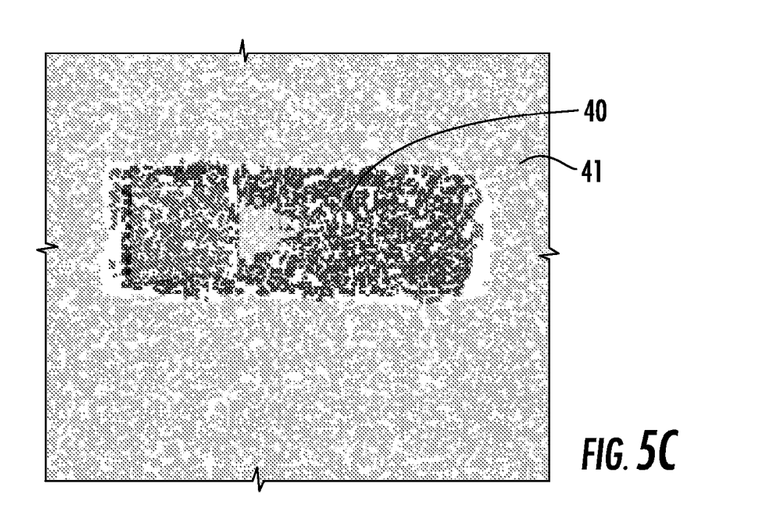

Referring now to FIGS. 3*a*-5*c*, simulation results from the image processing system 10 using LIDAR are now described. As perhaps best seen in FIGS. 3*a*-3*c*, the target again illustratively comprises a truck 40 traveling on the ground 41. As seen in FIGS. 4*a*-4*c*, the collected data for the LIDAR receiver includes substantial noise 42, which obscures the truck 40 and its relation to the ground 41. As can be seen in FIGS. 5*a*-5*c*, the method readily removes the undesired noise 42 from the collected data, permitting identification of the truck 40 for the user.

Another aspect is directed to a computer-readable medium having computer executable modules comprising a memory module 15, and a controller module 16. The controller module 16 cooperates with the memory module 15 for determining N nearest neighbors for each voxel among a plurality thereof, determining a respective distance between each voxel and its N nearest neighboring voxels, and selectively removing each given voxel if a respective distance to an Mth nearest neighboring voxel is greater than a first threshold, and with M being less than or equal to N.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An image processing device comprising:
a memory; and
a controller cooperating with said memory and configured for:
determining N nearest neighbors for each voxel among a plurality thereof,
determining a respective distance between each voxel and its N nearest neighboring voxels,
selectively removing each given voxel if a respective distance to an $M^{th}$ nearest neighboring voxel is greater than a first threshold, and with M being less than or equal to N, and
selectively removing each other given voxel if a respective distance to an Lth nearest neighboring voxel is less than a second threshold, with the second threshold being less than the first threshold and with L being less than M.

2. The image processing device according to claim 1 wherein said controller is configured to selectively set the first and second thresholds based upon the plurality of voxels.

3. The image processing device according to claim 1 wherein the plurality of voxels are based upon target information and noise.

4. The image processing device according to claim 1 wherein the plurality of voxels are based upon Geiger mode avalanche photodiode data.

5. The image processing device according to claim 1 wherein the plurality of voxels are based upon light detection and ranging (LIDAR) data.

6. The image processing device according to claim 1 wherein the plurality of voxels are based upon radio detection and ranging (radar) data.

7. An image processing device for processing a plurality of voxels to reduce noise from target information in a scene, the image processing device comprising:
a memory; and
a controller cooperating with said memory and configured for:
determining N nearest neighbors for each voxel among the plurality thereof,
determining a respective distance between each voxel and its N nearest neighboring voxels,
selectively removing each given voxel if a respective distance to an $M^{th}$ nearest neighboring voxel is greater than a first threshold, with M being less than or equal to N,
selectively removing each other given voxel if a respective distance to an $L^{th}$ nearest neighboring voxel is less than a second threshold, with the second threshold being less than the first threshold and with L being less than M, and
selectively setting the first and second thresholds based upon an iterative process.

8. The image processing device according to claim 7 wherein said controller is configured to selectively set the first and second thresholds based upon the plurality of voxels.

9. The image processing device according to claim 7 wherein the plurality of voxels are based upon at least one of Geiger mode avalanche photodiode data, light detection and ranging (LIDAR) data, and radio detection and ranging (radar) data.

10. A computer implemented method on a non-transitory computer-readable medium for processing image data, the method comprising:
determining N nearest neighbors for each voxel among a plurality thereof;
determining a respective distance between each voxel and its N nearest neighboring voxels;
selectively removing each given voxel if a respective distance to an $M^{th}$ nearest neighboring voxel is greater than a first threshold, with M being less than or equal to N; and
selectively removing each other given voxel if a respective distance to an Lth nearest neighboring voxel is less than a second threshold, with the second threshold being less than the first threshold and with L being less than M.

11. The method according to claim 10 further comprising selectively setting the first and second thresholds based upon the plurality of voxels.

12. The method according to claim 10 further comprising basing the plurality of voxels upon target information and noise.

13. The method according to claim 10 wherein the plurality of voxels are based upon at least one of Geiger mode avalanche photodiode data, light detection and ranging (LIDAR) data, and radio detection and ranging (radar) data.

14. A non-transitory computer-readable medium having computer executable modules comprising:
a memory module; and
a controller module cooperating with said memory module and operable for
determining N nearest neighbors for each voxel among a plurality thereof,
determining a respective distance between each voxel and its N nearest neighboring voxels,
selectively removing each given voxel if a respective distance to an $M^{th}$ nearest neighboring voxel is greater than a first threshold, and with M being less than or equal to N, and selectively remove each other given voxel if a respective distance to an $L^{th}$ nearest neighboring voxel is less than a second threshold, with the second threshold being less than the first threshold and with L being less than M.

15. The non-transitory computer-readable medium according to claim 14 wherein said controller module selectively sets the first and second thresholds based upon the plurality of voxels.

16. The non-transitory computer-readable medium according to claim 14 wherein the plurality of voxels are based upon target information and noise.

17. The non-transitory computer-readable medium according to claim 14 wherein the plurality of voxels are based upon at least one of Geiger mode avalanche photodiode data, light detection and ranging (LIDAR) data, and radio detection and ranging (radar) data.

* * * * *